United States Patent [19]
Miller

[11] 3,953,220
[45] Apr. 27, 1976

[54] REFRACTORY CELSIAN GLASS-CERAMICS

[75] Inventor: David M. Miller, Elmira, N.Y.

[73] Assignee: Corning Glass Works, Corning, N.Y.

[22] Filed: July 26, 1974

[21] Appl. No.: 492,053

[52] U.S. Cl. .................................. 106/39.8; 65/33; 106/39.6
[51] Int. Cl.² ...................... C03C 3/22; C03B 32/00
[58] Field of Search ............... 65/33; 106/39.6, 39.8

[56] References Cited
UNITED STATES PATENTS

| | | | |
|---|---|---|---|
| 3,201,266 | 8/1965 | MacDowell | 65/33 X |
| 3,578,470 | 5/1971 | Bahat et al. | 65/33 |
| 3,700,471 | 10/1972 | Duke | 65/33 X |
| 3,804,608 | 4/1974 | Gaskell | 65/33 |

FOREIGN PATENTS OR APPLICATIONS

| | | | |
|---|---|---|---|
| 159,268 | 12/1962 | U.S.S.R. | 65/33 |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

The present invention is concerned with the production of glass-ceramic articles wherein the crystal phase consists essentially of celsian ($BaO.Al_2O_3.2SiO_2$) with a minor amount of rutile ($TiO_2$). Such articles consist essentially, by weight, of about 20–40% $SiO_2$, 20–35% $Al_2O_3$, 20–35% BaO, 5–15% PbO and/or 2–15% $P_2O_5$, and 7–12% $TiO_2$. Such articles can have a use temperature up to about 1250°C, exhibit a coefficient of thermal expansion (room temperature to 900°C) between about 35–50 × $10^{-7}$/°C, may demonstrate modulus of rupture values in excess of 20,000 psi, and will have a high density (about 3.1–3.5 g/cc), thereby recommending their utility as heat transfer media in a process such as that devised for extracting oil from oil-containing shale.

3 Claims, No Drawings

REFRACTORY CELSIAN GLASS-CERAMICS

A glass-ceramic article is produced through the controlled crystallization in situ of a glass body which is brought about through the application of a carefully designed heat treatment thereto. Customarily, the production of glass-ceramic articles involves three basic steps. First, a glass-forming batch, in which a nucleating agent is commonly included, is compounded and melted. Second, the resulting melt is simultaneously cooled sufficiently rapidly to give a crystal free glass and an article of a desired geometry shaped therefrom. Third, the glass article is exposed to a heat treatment which will cause crystallization of the glass to occur in situ.

Conventionally, the preferred manner for carrying out the heat treatment contemplates two steps. Thus, the glass article is initially heated to a temperature in the vicinity of the annealing point of the glass to cause the development of nuclei therein. Subsequently, the temperature is raised (normally above the softening point of the glass) to effect the growth of crystals on the nuclei.

The crystallization in situ process involves the practically simultaneous growth of crystals on countless nuclei distributed throughout the bulk of the glass body. Therefore, the microstructure of a glass-ceramic article customarily consists of relatively uniformly-sized, fine-grained crystals homogeneously dispersed, but randomly oriented, within a residual glassy matrix. In general, the crystal phase comprises the predominant proportion of the article. Hence, glass-ceramic articles are generally at least 50% by weight crystalline and, frequently, are actually greater than 75% by weight crystalline. This very high crystallinity in glass-ceramic articles commonly results in such articles displaying chemical and physical properties quite different from those of the parent glass. In normal practice, the characteristics of the glass-ceramic article will approximately resemble those of the crystal glasses. And, it is self-evident that the residual glassy matrix will customarily have a composition substantially far removed from that of the parent glass since the components constituting the crystal phase will have been removed therefrom during the crystallization process.

Because the production of glass-ceramic articles is founded in the crystallization in situ of precursor glass articles, conventional glass-forming manufacturing processes such as blowing, casting, drawing, pressing, rolling, spinning, etc., can be readily employed in shaping articles of desired configurations and dimensions. Furthermore, the presence of the residual glassy matrix insures that the glass-ceramic article is free from voids as is non-porous.

For a more extensive discussion of the theoretical concepts and practical considerations involved in the manufacture of glass-ceramic articles, reference is hereby made to U.S. Pat. No. 2,920,971, the basic patent in the field of glass-ceramics. That patent describs a glass-ceramic article as being predominantly crystalline, i.e., at least 50% by weight crystalline, and explains that the crystal phases developed in glass-ceramic articles are a function of the parent glass composition and the heat treatment parameters to which the parent glass is subjected.

Glass-ceramic articles containing celsian, the monoclinic form of $BaO \cdot Al_2O_3 \cdot 2SiO_2$, as a primary crystal phase are well-known to the art. Thus, U.S. Pat. No. 3,201,266 describes glass-ceramic bodies in the $Na_2O$-$BaO$-$Al_2O_3$-$SiO_2$ composition area which contain nepheline ($Na_2O \cdot Al_2O_3 \cdot 2SiO_2$) as the primary crystal phase with celsian in significant amounts as the secondary phase. Such bodies have been commercially marketed as dinnerware by Corning Glass Works under the trademark CENTURA.

Celsian is a very refractory material having a melting point in excess of 1700°C. Glasses have been made utilizing batches approximating the stoichiometry of $BaO \cdot Al_2O_3 \cdot 2SiO_2$ which, when nucleated with $TiO_2$, yield fine-grained glass-ceramics consisting essentially of celsian with a minor amount of rutile ($TiO_2$). Such articles have exhibited coefficients of thermal expansion over the temperature range between room temperature and 900°C between about $35-50 \times 10^{-7}/°C$, a modulus of rupture range which can be in excess of 20,000 psi, and a density of about 3.1 g/cc.

However, one serious problem which has militated against widespread development and commercialization of glass-ceramic articles containing celsian as the principal phase has been the difficulty in securing good glass formation. Thus, liquidus temperatures in excess of 1580°C, coupled with marginal glass stability, i.e., the tendency to devitrify, have made glass formation a formidable task utilizing conventional melting and forming procedures. In the case of U.S. Pat. No. 3,201,266, supra, $Na_2O$ was added which permitted good glass formation but, concomitantly, severely reduced the refractoriness of the crystallized body. High temperature use is, of course, not necessary in an application such as dinnerware.

The primary objective of the instant invention is to provide glass-ceramic bodies consisting essentially of celsian which can be crystallized in situ from glasses produced in accordance with conventional melting and forming procedures.

A further objective is to provide such celsian-containing glass-ceramic bodies which have use temperatures under load up to about 1250°C, exhibit coefficients of thermal expansion from room temperature (R.T.) to 900°C of about $35-50 \times 10^{-7}/°C$, can demonstrate modulus of rupture values in excess of 20,000 psi, and have densities between about 3.1–3.5 g/cc.

These objectives can be accomplished by including PbO and/or $P_2O_5$ in the base glass compositions to yield the quinary $BaO$-$Al_2O_3$-$SiO_2$-$TiO_2$-$PbO$ and/or $P_2O_5$. In broad terms, the invention contemplates melting a batch for a glass consisting essentially, by weight on the oxide basis, of about 20–35% BaO, 20–35% $Al_2O_3$, 20–40% $SiO_2$, 5–15% PbO and/or 3–15% $P_2O_5$, the total PbO + $P_2O_5$ not exceeding about 20%, and 7–12% $TiO_2$, cooling the melt to a glass and crystallizing the glass body in situ through heat treatments at temperatures between about 1050°–1300°C. The crystal assemblage is comprised predominantly of celsian with a minor amount of rutile.

To achieve the most favorable physical properties, and, particularly, to retain high refractoriness, the glass compositions will contain only the base conponents within the prescribed ranges. However, minor additions of other metal oxides or fluoride can be tolerated as melting or forming aids or to specifically influence some physical property of the final product. Nevertheless, the total of all such additions ought not to exceed about 3% by weight. Furthermore, the inclusion of the alkali metal oxides, especially $Li_2O$, $Na_2O$, and $K_2O$, is particularly eschewed since the growth of crystal phases other than celsian or an increased amount of residual glass is hazarded. For example, the presence of Li₂O, particularly, can lead to the growth of hexacelsian (the hexagonal form of BaO.Al₂O₃.2SiO₂) which has a higher coefficient of thermal expansion [~80 × 10⁻⁷/°C].

The crystallization of the precursor glass body is a function of time and temperature. Thus, in the cooler portion of the 1050°–1300°C range relatively long exposure times will be required to obtain a highly crystalline article, perhaps as long as 24 hours or even longer; whereas, at the upper extreme of the crystallization range, exposure times for as little as 15 minutes may be adequate.

In one embodiment of the manufacturing process, the glass melt will be simultaneously cooled and shaped and then further cooled to about room temperature to permit visual inspection of glass quality. However, this latter cooling to room temperature is not demanded to secure the desired high crystallinity within the article. Nevertheless, it is required that the melt be cooled to at least within the transformation range thereof before subjecting the glass article to the delineated crystallization heat treatment. The transformation range has been defined as that temperature at which a liquid melt is deemed to have been transformed into an amorphous solid. It has generally been considered that the transformation range lies in the vicinity of the annealing point of a glass.

The preferred crystallization procedure contemplates two steps. First, the glass article is heated to a temperature somewhat above the transformation range of the glass, i.e., a temperature between about 800°–1000°C, and held within that range for a sufficient length of time to achieve good nucleation. Second, the nucleated article is heated to a temperature within the 1050°–1300°C range for the necessary period of time to secure the desired extensive crystal growth. This preferred practice customarily provides for a nucleation period of about 1–8 hours and a dwell period of about 1–8 hours for crystallization.

Nevertheless, whereas the two-step heat treatment schedule constitutes the preferred method, it must be recognized that numerous modifications in the crystallization practice are possible. The one parameter that must be observed is an exposure to temperatures between about 1050°–1300°C.

As was explained above, the rate of crystal growth is a function of temperature. Therefore, at temperatures just slightly above the transformation range, crystal growth will be quite slow and the glass body prone to thermal deformation. In view of that circumstance, the rate at which the glass body is heated at temperatures above the transformation range must not be so rapid that there is inadequate time for a sufficient growth of crystals to occur to provide support for the body. Heating rates of 10°C/minute and greater can be employed where some physical support is provided to inhibit deformation. However, very little slumping or deformation will be observed over the whole range of compositions operable in the instant invention where heating rates not exceeding about 3°–5°C/minute are employed. Such rates, hence, comprise the preferred practice. The preferred two-step heat treatment procedure also aids in minimizing body deformation since a substantial hold within the nucleation range assures more rapid and uniform subsequent crystallization.

Table I records compositions of thermally crystallizable glasses, expressed in weight percent on the oxide basis, which, when subjected to the appropriate crystallization practice of this invention, can be crystallized in situ to glass-ceramic articles containing relatively uniformly-sized, fine-grained crystals of monoclinic celsian with a minor amount of rutile randomly oriented, but homogeneously dispersed, within a residual glassy matrix. The actual ingredients of the glass batches can be any materials, either oxides or other compounds, which, on being melted together, are transformed into the desired oxide compositions in the proper proportions. The batch components were compounded, ball-milled together to assist in securing a homogeneous melt, and then melted in open platinum crucibles for about 16 hours at temperatures ranging between about 1500°–1650°C. Subsequently, the molten glass was poured into a steel mold to yield a glass slab about 6 inches × 6 inches × ½ inch and that slab immediately transferred to an annealer operating at about 780°C. Where desirable, and commonly in large scale pot or continuous tank melts, a fining agent such as As₂O₃ or Sb₂O₃ can be useful in about up to 1–2%.

TABLE I

|  | 1 | 2 | 3 | 4 | 5 | 6 | 7 | 8 |
|---|---|---|---|---|---|---|---|---|
| SiO₂ | 30.9% | 34.5% | 25.7% | 37.5% | 30.73% | 27.48% | 29.80% | 31.06% |
| Al₂O₃ | 28.7 | 26.5 | 29.9 | 22.1 | 28.13 | 29.48 | 27.27 | 24.39 |
| BaO | 22.9 | 21.9 | 31.5 | 23.0 | 31.92 | 31.91 | 24.76 | 26.62 |
| PbO | 8.4 | 7.9 | — | 8.2 | — | — | 9.00 | 9.70 |
| P₂O₅ | — | — | 3.7 | — | 0.96 | 2.88 | 0.91 | — |
| TiO₂ | 9.1 | 9.2 | 9.2 | 9.2 | 8.26 | 8.25 | 8.26 | 8.23 |

After annealing to room temperature, the glass slabs of Table I were examined for glass quality and test specimens cut therefrom. Liquidus measurements were conducted on the glass samples utilizing a gradient furnace in the conventional manner. Other glass samples were placed into an electrically-fired furnace and subjected to the heat treatment schedules reported in Table II. Each sample was heated at a rate of about 5°C/minute to the dwell temperatures recited. Upon completion of the crystallization schedule, the electric current to the furnace was cut off and the samples allowed to cool to room temperature within the furnace. Such practice has been termed "cooling at furnace rate". This rate of cooling has been estimated to average about 3°–5°C/minute. More rapid rates of cooling are possible, particularly on thin-walled articles, but this cooling at furnace rate practice has been customarily utilized out of simple convenience.

Table II also sets forth a visual description of the product and the crystal phases present as identified through X-ray diffraction analysis. The coefficient of thermal expansion over the temperature range of room temperature (R.T.) to 900°C (×10⁻⁷/°C), the modulus of rupture (psi), and the density of the crystallized body (g/cc), are reported as determined in the conventional manner on individual samples. Example 2 exhibited an electrical resistivity at 506°C of 8.24 ohm-cm and a dielectric strength at R.T. of 4500 volts/mil. Liquidus measurements conducted on Examples 2 and 4 gave values of 1530°C and 1520°C, respectively.

slumping of the crystallized body. An excess of $Al_2O_3$ and $SiO_2$ can also lead to such unwanted crystal phases as mullite ($3Al_2O_3.2SiO_2$) and corundum ($Al_2O_3$).

I claim:

TABLE II

| Example No. | Heat Treatment | Visual Description | Crystal Phases | Exp. Coef. | Density | Modulus of Rupture |
|---|---|---|---|---|---|---|
| 1 | 820°C for 4 hours<br>1250°C for 4 hours | White, semi-glossy, fine-grained | Celsian, rutile | 44.3 | 3.381 | |
| 2 | 820°C for 4 hours<br>1250°C for 4 hours | White, semi-glossy, fine-grained | Celsian, rutile | 39.0 | 3.324 | 16,000 |
| 3 | 860°C for 6 hours<br>1300°C for 4 hours | White, glossy, fine-grained | Celsian, rutile | 47.5 | 3.325 | 21,000 |
| 4 | 820°C for 4 hours<br>1250°C for 4 hours | White, glossy, fine-grained | Celsian, rutile | 37.7 | 3.276 | |
| 5 | 800°C for 6 hours<br>1300°C for 2 hours | White, glossy, fine-grained | Celsian, rutile | 42.5 | 3.30 | |
| 6 | 300°C for 6 hours<br>1300°C for 2 hours | White, glossy, fine-grained | Celsian, rutile | 45.7 | 3.31 | |
| 7 | 800°C for 6 hours<br>1300°C for 2 hours | White, glossy, fine-grained | Celsian, rutile | 42.5 | 3.40 | |
| 8 | 800°C for 4 hours<br>1250°C for 4 hours | White, glossy, fine-grained | Celsian, rutile | 45.2 | 3.46 | |

Table II illustrates the range of physical properties which the glass-ceramic products of the present invention can exhibit as well as the internal microstructure and crystal phases present determining those characteristics. The articles are commonly very highly crystalline, i.e., generally greater than about 75% by volume crystalline, and, frequently, virtually 100% crystalline. The crystals, themselves, are uniformly fine-grained with essentially all being smaller than 5 microns in diameter and the majority thereof being less than 1 micron in diameter.

The crystals give a pattern very similar to celsian when examined via X-ray diffraction analysis but certain of the identifying lines are somewhat misplaced and the intensities somewhat at variance. These minor, but visible, changes from the classic pattern have led to the assumption that the crystals are actually a solid solution of celsian wherein PbO has substituted for BaO and/or $AlPO_4$ has substituted for $SiO_2$ in the basic structure.

The above-recited ranges of BaO, $Al_2O_3$, $SiO_2$, PbO, $P_2O_5$, and $TiO_2$ are demanded to achieve the desired melting and stability characteristics in the original glass and to obtain the high refractoriness, high density, and high strength sought. Hence, a minimum of about 20% $SiO_2$ is necessary to assure glass stability, i.e., to forestall devitrification of the melt during cooling. The $Al_2O_3$ content will be maintained below 35% to avoid liquidus problems. The PbO and $P_2O_5$ additions serve to reduce the melting temperature of the glass. However, the maximum of 20% total of these components ought to be observed to prevent adverse effects upon the refractoriness of the final product. The residual glassy matrix will have a lower viscosity which can deleteriously affect the resistance to deformation and 1. A method for making a glass-ceramic article exhibiting a coefficient of thermal expansion over the range of R.T. to 900°C. of about $35-50 \times 10^{-7}/°C$., a use temperature under load up to about 1250°C., and a density of about 3.1–3.5 g/cc, said article consisting predominantly of celsian solid solution crystals and rutile crystals homogeneously dispersed within a glassy matrix with said crystals constituting at least 75% by volume of the article, which comprises:
   a. melting a batch for a glass consisting essentially, by weight on the oxide basis, of about 20–35% BaO, 20–35% $Al_2O_3$, 20–40% $SiO_2$, 5–15% PbO and/or $P_2O_5$, the total PbO + $P_2O_5$ not exceeding about 20%, and 7–12% $TiO_2$ as a nucleating agent;
   b. simultaneously cooling the melt to at least within the transformation range thereof such that said melt is transformed into an amorphous solid and shaping a glass body therefrom;
   c. heating said glass body above the transformation range thereof to a temperature between about 1050°–1300°C. for a period of time sufficient to effect the desired nucleation and crystallization of celsian solid solution crystals and rutile crystals; and then
   d. cooling the crystallized article to room temperature.

2. A method according to claim 1 wherein said glass body is first heated to a temperature between about 800°–1000°C. for about 1–8 hours to achieve good nucleation and thereafter heated to a temperature between about 1050°–1300°C. for about 1–8 hours to secure the desired extensive crystal growth.

3. A glass-ceramic article made by the process of claim 1.

* * * * *